United States Patent
Higuchi (10) Patent No.: US 6,742,773 B2
(45) Date of Patent: Jun. 1, 2004

(54) STEAM PRESSURE REDUCING AND CONDITIONING VALVE

(75) Inventor: Hiroyuki Higuchi, Kashiwazaki (JP)

(73) Assignee: Dresser, Inc., Addison, TX (US)

( * ) Notice: Subject to any disclaimer, the term of this patent is extended or adjusted under 35 U.S.C. 154(b) by 92 days.

(21) Appl. No.: 10/039,345

(22) Filed: Jan. 4, 2002

(65) Prior Publication Data

US 2002/0096052 A1 Jul. 25, 2002

(51) Int. Cl.⁷ .............................. B01F 3/04; F16K 11/00
(52) U.S. Cl. .................. 261/76; 261/116; 261/DIG. 13; 137/896
(58) Field of Search ...................... 95/149, 224; 96/322, 96/243, 270, 271, 273; 261/116, 76, DIG. 13; 137/896

(56) References Cited

U.S. PATENT DOCUMENTS

| | | | |
|---|---|---|---|
| 1,152,176 A | 8/1915 | Hennebohle |
| 1,307,986 A | 6/1919 | Randall et al. |
| 1,832,652 A | 11/1931 | Peebles |
| 2,095,263 A | 10/1937 | Moss |
| 2,207,646 A | 7/1940 | Van Der Ploeg |
| 2,354,842 A | 8/1944 | Spence |
| 2,421,761 A | * | 6/1947 | Rowand et al. |
| 2,924,424 A | 2/1960 | Titterington |
| 2,984,468 A | 5/1961 | Kuhner |
| 3,034,771 A | 5/1962 | Marris |
| 3,050,262 A | 8/1962 | Curtis |
| 3,207,492 A | 9/1965 | Zikesch |
| 3,219,323 A | * | 11/1965 | Spence |
| 3,220,708 A | 11/1965 | Matsui |
| 3,318,321 A | 5/1967 | Odendahl |
| 3,331,590 A | 7/1967 | Battenfeld et al. |
| 3,496,724 A | 2/1970 | Wilson |
| 3,648,714 A | 3/1972 | Laveau |
| 3,709,245 A | 1/1973 | O'Connor, Jr. |
| 3,719,524 A | * | 3/1973 | Ripley et al. |
| 3,722,854 A | 3/1973 | Parola |
| 3,732,851 A | * | 5/1973 | Self |
| 3,735,778 A | 5/1973 | Garnier |
| 3,746,049 A | 7/1973 | O'Connor, Jr. |

(List continued on next page.)

FOREIGN PATENT DOCUMENTS

| | | |
|---|---|---|
| DE | 37 17 128 A1 | 12/1988 |
| DE | 298 01 762 U1 | 4/1998 |
| FR | 595499 | 10/1925 |
| FR | 2082083 | 11/1971 |
| GB | 772058 | 4/1957 |
| GB | 2019532 | 10/1979 |
| JP | 61153082 | 7/1986 |
| WO | WO 91/00971 | 1/1991 |
| WO | WO 97 03313 | 1/1997 |

OTHER PUBLICATIONS

Patent application Ser. No. 10/082,620, filed Feb. 22, 2002.
Stares, Gober and Robert; "4100 Series Control Valves"; Masoneilan; May 1997; 6 pages.
SteamForm Conditioning Valves, Yarway Tyco Corporation 1981.

(List continued on next page.)

Primary Examiner—Duane S. Smith
(74) Attorney, Agent, or Firm—Fish & Richardson P.C.

(57) ABSTRACT

A steam pressure reducing and conditioning valve for passing a superheated steam S inflowing from a first port 1 through a pressure reducing section 2, and, supplying subcooled water mist W and discharging desuperheated and depressurized steam S2 from a second port 3, wherein a first nozzle 4 for supplying mist W is provided in proximity to the pressure reducing section 2. The nozzle 4 injects subcooled water mist in a planar pattern r perpendicular to the flow of depressurized steam S1. Said first nozzle 4 is disposed such that there is a predetermined distance L between the jet pattern r of moisture W injected from the nozzle and the pressure reducing section 2.

17 Claims, 4 Drawing Sheets

U.S. PATENT DOCUMENTS

| | | | |
|---|---|---|---|
| 3,750,698 A | | 8/1973 | Walchle et al. |
| 3,776,278 A | | 12/1973 | Allen |
| 3,813,079 A | | 5/1974 | Baumann et al. |
| 3,856,049 A | | 12/1974 | Scull |
| 3,904,722 A | * | 9/1975 | Onodo et al. |
| 3,931,371 A | * | 1/1976 | Maurer et al. |
| 3,941,350 A | | 3/1976 | Kluczynski |
| 3,978,891 A | | 9/1976 | Vick |
| 3,981,946 A | * | 9/1976 | Soya et al. |
| 3,990,475 A | | 11/1976 | Myers |
| 4,011,287 A | * | 3/1977 | Markey |
| 4,022,423 A | | 5/1977 | O'Connor et al. |
| 4,068,683 A | | 1/1978 | Self |
| RE29,714 E | | 8/1978 | Hayner et al. |
| 4,105,048 A | | 8/1978 | Self |
| 4,128,109 A | | 12/1978 | Chervenak et al. |
| 4,149,563 A | | 4/1979 | Seger |
| 4,243,203 A | | 1/1981 | Mack |
| 4,249,574 A | | 2/1981 | Schnall et al. |
| 4,267,045 A | | 5/1981 | Hoof |
| 4,270,559 A | | 6/1981 | Wallberg |
| 4,278,619 A | * | 7/1981 | Tiefenthaler |
| 4,279,274 A | | 7/1981 | Seger |
| 4,352,373 A | | 10/1982 | Kay et al. |
| 4,383,553 A | | 5/1983 | Platt |
| 4,387,732 A | | 6/1983 | Hetz |
| 4,397,331 A | | 8/1983 | Medlar |
| 4,407,327 A | | 10/1983 | Hanson et al. |
| 4,413,646 A | | 11/1983 | Platt et al. |
| 4,427,030 A | | 1/1984 | Jouwsma |
| 4,442,047 A | * | 4/1984 | Johnson |
| 4,505,865 A | * | 3/1985 | Wullenkord |
| 4,567,915 A | | 2/1986 | Bates et al. |
| 4,593,446 A | | 6/1986 | Hayner |
| RE32,197 E | | 7/1986 | Self |
| 4,619,436 A | | 10/1986 | Bonzer et al. |
| 4,624,442 A | | 11/1986 | Duffy et al. |
| 4,671,321 A | | 6/1987 | Paetzel et al. |
| 4,688,472 A | | 8/1987 | Inglis |
| 4,718,456 A | | 1/1988 | Schoonover |
| 4,739,795 A | | 4/1988 | Ewbank et al. |
| 4,887,431 A | | 12/1989 | Peet |
| 4,909,445 A | * | 3/1990 | Schoonover |
| 4,941,502 A | | 7/1990 | Loos et al. |
| 4,967,998 A | | 11/1990 | Donahue |
| 5,005,605 A | * | 4/1991 | Kueffer et al. |
| 5,012,841 A | * | 5/1991 | Kueffer |
| 5,156,680 A | | 10/1992 | Orzechowski |
| 5,336,451 A | * | 8/1994 | Lovick |
| 5,380,470 A | * | 1/1995 | Jacobsson |
| 5,385,121 A | * | 1/1995 | Feiss |
| 5,390,896 A | | 2/1995 | Smirl |
| 5,427,147 A | | 6/1995 | Henriksson |
| 5,672,821 A | | 9/1997 | Suzuki |
| 5,730,416 A | | 3/1998 | Welker |
| 5,762,102 A | | 6/1998 | Rimboym |
| 5,765,814 A | | 6/1998 | Dvorak et al. |
| 5,769,388 A | | 6/1998 | Welker |
| 5,819,803 A | | 10/1998 | Lebo et al. |
| 5,924,673 A | | 7/1999 | Welker |
| 5,931,445 A | | 8/1999 | Dvorak et al. |
| 6,003,551 A | | 12/1999 | Wears |
| 6,105,614 A | | 8/2000 | Bohaychuk et al. |
| 6,250,330 B1 | | 6/2001 | Welker |
| 6,289,934 B1 | | 9/2001 | Welker |
| 2002/0960552 | * | 7/2002 | Higuchi |

OTHER PUBLICATIONS

Copes–Vulcon; SA–35 Steam Atomizing Desuperheater, White; Consolidated Industries, Bulletin 1164; May 1; 5 pages.

Patent application Ser. No. 10/039,345, filed Jan. 4, 2002.

Patent application Ser. No. 10/038,985, filed Jan. 4, 2002.

Hiroyuki Higuchi, Steam Pressure Reducing and Conditioning System, U.S. patent application Ser. No. 10/039,343, filed Jan. 4, 2002.

European Search report for Application 02007252 dated Apr. 3, 2003.

European Search report for Application 02007253.4 completed Jul. 24, 2002.

Product Brochure titled "Masonelian Steam Form II" printed Oct. 12, 2001 and distributed at Power Generation Show held in Las Vegas, Nevada on Dec. 11–13, 2001 and at Power Generation Show in Milan, Italy Jun. 11–13, 2002.

European Patent Office Search Report signed by Girbes Fontana, completed Sep. 8, 2003.

* cited by examiner

Prior Art

Fig-4

Prior Art

STEAM PRESSURE REDUCING AND CONDITIONING VALVE

RELATED APPLICATION

The present invention includes common subject matter disclosed in U.S. application Ser. No. 10/038,985 entitled Steam Pressure Reducing and Conditioning Valve by the same inventor Hiroyuki Higuchi filed concurrently on Jan. 4, 2003, the disclosure of which is incorporated herein by reference.

TECHNICAL FIELD OF THE INVENTION

The present invention concerns a steam pressure reducing and conditioning valve.

BACKGROUND OF THE INVENTION

Figure 3:
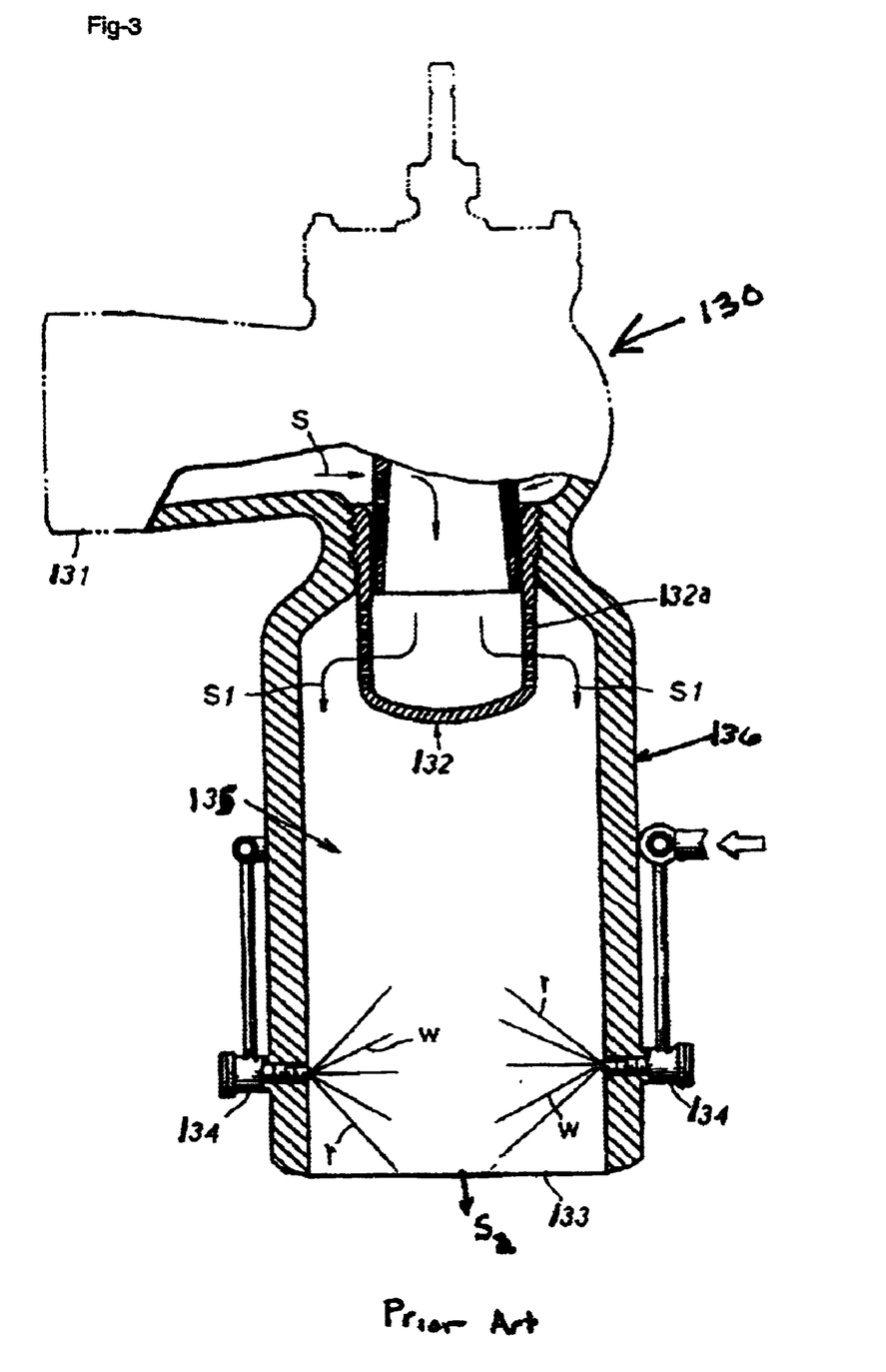
FIG. 3 is a side view of a prior art conditioning valve having a portion of the valve cut away to illustrate a partial cross-section view.

FIG. 3 illustrates a first embodiment steam pressure reducing and conditioning valve (hereinafter "conditioning valve") 130 wherein hot and high pressure steam S inflowing from a first port 131 is desuperheated and depressurized by passing through a pressure reducing section 132 having scattered small holes 132a, and transformed into a rapid annular flow steam S1. The steam S1 is discharged from a second port 133 as desuperheated and depressurized steam S2 by supplying the rapid annular flow vapor S1 with subcooled water mist W in a body 136.

Figure 4:
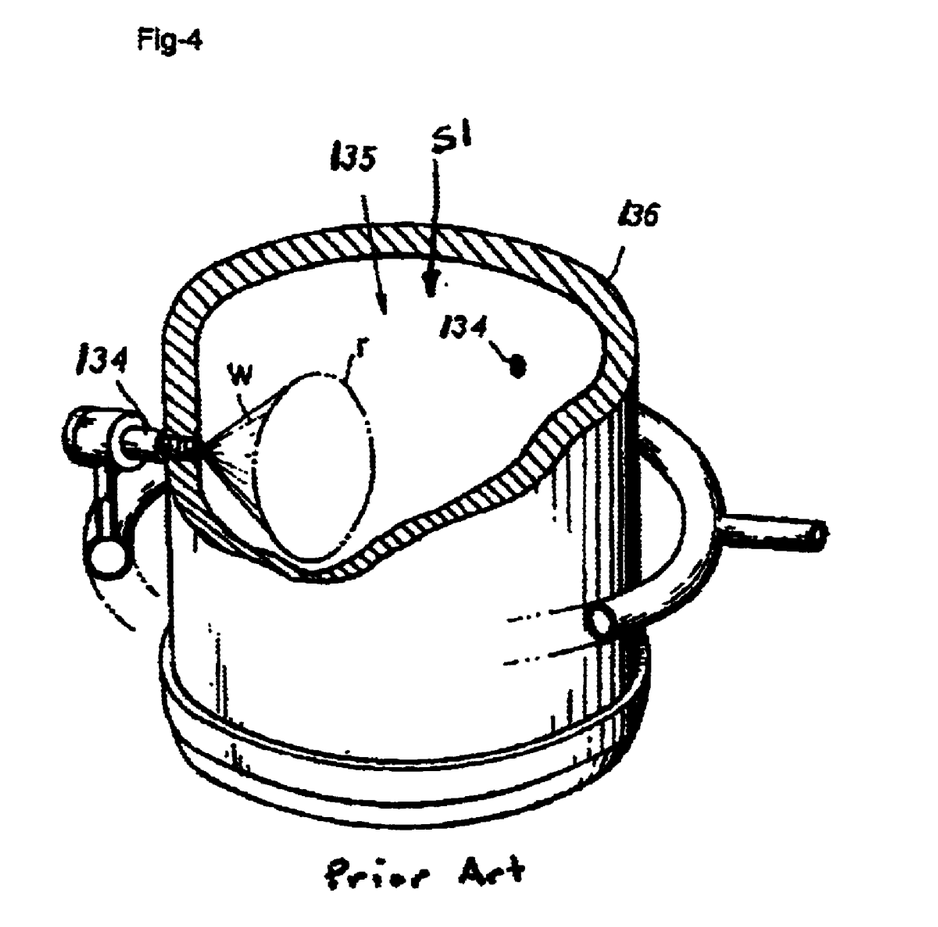
FIG. 4 is a perspective view from above illustrating a lower portion of the prior art valve of FIG. 3.

As shown in FIG. 4, the subcooled water mist W is injected from a nozzle 134, into a moisture jet section 135, and the jet pattern of this subcooled water mist W is conical. The subcooled water mist W injected from nozzle 134 collides with the steam S1, to cool down the steam S1.

Referring again to FIG. 3, when the subcooled water mist W injected from the nozzle 134 comes into contact with the pressure reducing section 132 in a hot state, the pressure reducing section 132 may crack and break due to an extreme temperature change. To prevent the cracking, the subcooled water mist W from the nozzle 134 should not come into contact with the pressure reducing section 132.

Consequently, in the prior art, the nozzle 134 is disposed remote from the pressure reducing section 132 so that the subcooled water mist W injected from the nozzle 134 will not come into contact with the pressure reducing section 132, thereby increasing the size of the body 136 and necessarily resulting in enlargement of the whole valve.

The superheated steam S is cooled by colliding the rapid annular flowing steam S1 with the subcooled water mist W, and further dispersing the droplets (mist) of subcooled water W.

However, when the nozzle 134 is disposed remote from the pressure reducing section 132 for the aforementioned reason, it is difficult to disperse (subdivide) the subcooled water as the velocity of the annular flowing steam decreases with the distance from the pressure reducing section 132.

BRIEF DESCRIPTION OF THE DRAWINGS

The disclosed invention will be described with reference to the accompanying drawings, which show important sample embodiments of the invention and which are incorporated in the specification hereof by reference. A more complete understanding of the present invention may be had by reference to the following Detailed Description when taken in conjunction with the accompanying drawings, wherein.

DESCRIPTION OF SYMBOLS

L Distance
r Jet pattern
S Vapor
W Subcooled water mist ("moisture")

SUMMARY OF THE INVENTION

Figure 1:
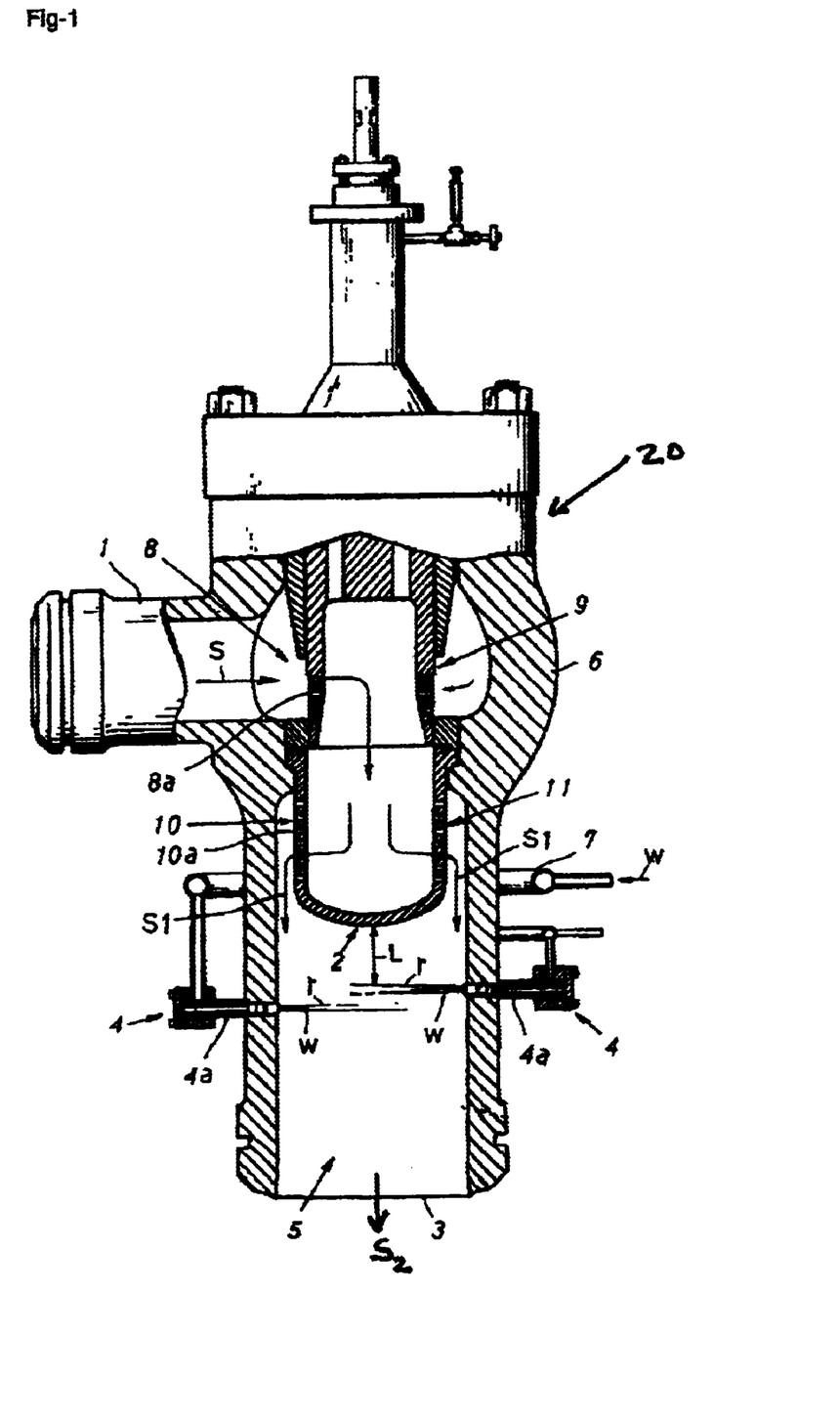
FIG. 1 is a side view of a conditioning valve of the present invention having a portion of the valve cut away to illustrate a partial cross-section view.

The present invention comprises a conditioning valve 20 for passing a superheated steam S inflowing from a first port 1 through a pressure reducing section 2, and supplying subcooled water mist W and discharging depressurized and desuperheated steam S2 from a second port 3. One or more nozzles 4 for subcooled water W are provided in proximity to said pressure reducing section 2. A flat nozzle 4a injects subcooled water mist W in a planar pattern r. Nozzle 4 is configured so that there is a predetermined distance L between the jet pattern r of moisture W injected from flat nozzle 4a and the pressure reducing section 2.

In one embodiment, vapor change valve 20 includes a pressure reducing section 2 with a bottom and a cylindrical shape. The subcooled water mist W jet pattern r is selected to be substantially parallel to the bottom of the pressure reducing section 2.

It will be understood by those skilled in the art that one or more of nozzles 4 for injecting moisture W may be juxtaposed in several stages in the moisture jet section 5 of valve 20. The nozzle 4 disposed in the position nearest to the pressure reducing section 2 is a flat nozzle 4a. Other nozzles 4 disposed further away from the pressure reducing section 2 may have jet patterns of either planar or conical shape.

In the present invention, a superheated steam S can be cooled more efficiently than the prior art, by adopting a flat nozzle 4a having the subcooled water mist W jet pattern r planar.

To be more specific, the nozzle 4 can be placed as nearest as possible to the pressure reducing section 2 by adopting a flat nozzle 4a with a planar jet pattern, and setting the plane direction of the subcooled water mist W to be injected in a direction perpendicular to the steam S1 flow direction, and thus preventing the moisture W from making contact with the pressure reducing section 2; whereby the subcooled water mist W can be injected against a high velocity steam S1 (power most appropriate for dispersing (subdividing) the subcooled water mist W) immediately after passing through the pressure reducing section 2.

Therefore, the present invention can depressurize and condition superheated steam, and moreover, the size of the valve can be reduced and still avoid cracking and breaking of pressure reducing section 2.

DETAILED DESCRIPTION

Reference is now made to the Drawings wherein like reference characters denote like or similar parts throughout the Figures.

In the preferred embodiment, a cylindrical body 6 comprising a first port 1 for introducing a superheated steam S and a second port 3 for discharging depressurized and desuperheated steam is provided with a pressure reducing section 2 for cooling and depressurizing the superheated steam S, and a moisture jet section 5 for cooling by injecting a mist of subcooled water W into the steam S1 having passed through pressure reducing section 2.

Pressure reducing section 2 comprises, as shown in FIG. 1, a vertically movable plug 9 having a small hole section 8 provided with small holes 8a scattered around a cylindrical body with an open lower end, and a diffuser 11 fixed to the body 6 at the lower position of this plug 9 in communication with said plug 9, and having a small hole section 10 provided with small holes 10a scattered around a cylindrical body with a bottom and an open upper end, and is configured to depressurize the superheated steam S by passing through the small hole 8a of the plug 9 and the small holes 10a of the diffuser 11 and transform it into an annular flowing steam S1.

Figure 2:
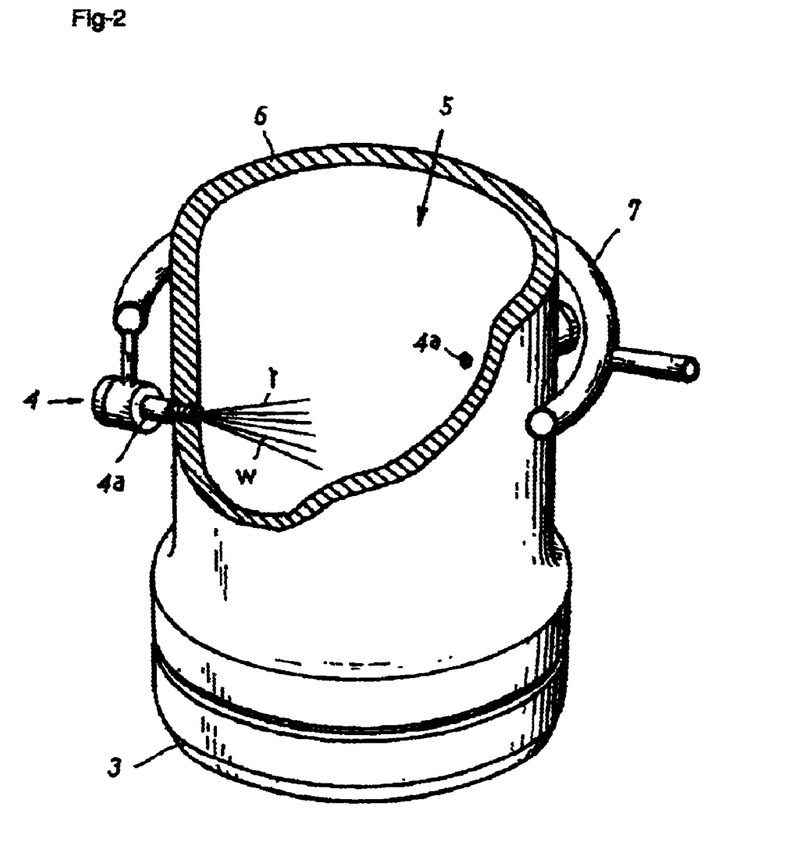
FIG. 2 is a perspective view from above illustrating a lower portion of the valve body of the conditioning valve of FIG. 1.

The moisture jet section 5 is provided with one or more (preferably at least 3) nozzles 4 disposed annularly and on a same plane for supplying atomized moisture W (subcooled water) to an inner wall face of the body 6. Subcooled water mist W is supplied to nozzles 4 by water supply pipe 7. Additional groups of nozzles 4 may be juxtaposed in the longitudinal direction of the body 6 in several stages in the longitudinal direction.

Moreover, in this embodiment, a flat nozzle 4a (jet angle 160 degrees or less, nozzle gap 10 mm or less) is adopted having a flat (sector) jet pattern r. The planar orientation of the jet pattern subcooled water mist W from this flat nozzle 4a is oriented perpendicular to the flow direction of the annular flow vapor S1, and at a predetermined distance L, between the jet pattern r of the subcooled water mist W injected from this flat nozzle 4a and the pressure reducing section 2 preventing the subcooled water mist W from making contact with the pressure reducing section 2.

Also, among these nozzles 4, at least the nozzle 4 nearest the pressure reducing section 2 should be a flat nozzle 4a, and the other nozzles 4 may either be nozzles 4 having a conical jet pattern r of the subcooled water mist W similarly to the conical jets known in the prior art or flat nozzles 4a.

It will be understood by those skilled in the art that the number of nozzles 4 can be varied to adjust the temperature of the steam S2 exiting the conditioning valve of the present invention.

In operation, the conditioning valve 20 desuperheats and depressurizes the superheated steam S introduced from the first port 1 by passing through the pressure reducing section 2, transforms it into a high velocity annular flowing depressurized steam S1 flowing into the moisture jet section 5 from an annular section defined between the body 6 and the pressure reducing section 2. The mist of subcooled water W is injected from the nozzle 4 and impinges against the annular flowing steam S1. The subcooled water mist W is dispersed (subdivided) to cool the depressurized steam S1 which exits valve 20 as depressurized and desuperheated steam S2.

In this embodiment, having flat nozzle 4a with a flat jet pattern r, the nozzle 4 can be disposed as near as possible to the pressure reducing section 2 (diffuser 11). Nozzle 4 can be positioned closer to pressure reducing section 2 than the nozzle 134 of the prior art that injects the chilled water mist W conically. The mist W impinges against the powerful (power most appropriate for subdividing the moisture W) annular flowing steam S1 immediately after exiting the annular spaces between the body 6 and the pressure reducing section 2.

In this respect, the Applicant has performed various experiments, confirming the following points:

A nozzle 134 having a conical subcooled water mist W jet pattern r (as in the prior art), cannot be disposed near the pressure reducing section 2 because it is difficult to have sufficient velocity in the annular flowing steam S1 to disperse (subdivide) the subcooled water mist W. Additionally, the collision angle of the annular flowing steam S1 varies due to an unstable jet direction. The relative velocity of the annular flowing steam S1 fluctuates, and the mist diameter after the subdivision by the collision with the annular flowing steam S1 becomes uneven, reducing the cooling effect (it is important to make the mist diameter after the subdivision by the collision even to achieve effective cooling).

On the contrary, if a flat nozzle 4a is adopted as in the present invention, the nozzle 4 can be disposed as near as possible to the pressure reducing section 2 as mentioned before. It is possible to make the annular flowing steam S1 impinge powerfully against the subcooled water mist W and to subdivide the mist W sufficiently, and moreover, as the annular flowing steam S1 is injected in a fixed direction perpendicular to the flow direction of the annular flowing steam S1, the mist diameter after the subdivision becomes even, increasing the cooling effect dramatically over the prior art.

Moreover, in this embodiment, as the nozzle 4 can be disposed as near as possible to the pressure reducing section 2, it is possible to reduce the longitudinal length of the lower portion (moisture jet section) 5 in which the mist W is injected, and eventually to reduce the size of the whole valve.

A preferred embodiment of the invention has been illustrated in the accompanying Drawings and described in the foregoing Detailed Description. It will be understood that the invention is not limited to the embodiment disclosed, but is capable of numerous modifications without departing from the scope of the invention as claimed.

I claim:

1. A steam pressure reducing and conditioning valve for passing a superheated steam inflowing from a first port through a pressure reducing section, and supplying a mist of subcooled water and discharging cooled and decompressed vapor from a second port, wherein a nozzle for supplying said mist is provided in the proximity to said pressure reducing section, a flat nozzle injecting said mist in a planar pattern whereby the planar orientation is perpendicular to the direction of steam flows, and it is disposed a predetermined distance from said pressure reducing section.

2. The valve of claim 1, wherein the pressure reducing section has a bottom and a cylindrical form, and the mist pattern is substantially parallel to the bottom of the pressure reducing section.

3. The vapor change valve of claim 1, wherein nozzles for supplying said mist are juxtaposed longitudinally in several stages in the flow direction of steam oriented towards the second port and at least the nozzle disposed at the position nearest to the pressure reducing section is a flat nozzle.

4. A conditioning valve for desuperheating and depressurizing superheated steam, the valve comprising:
 a pressure reducing section for reducing the pressure of the steam; and
 a moisture jet section downstream of the pressure reducing section, wherein the moisture jet section comprises:
  one or more flat nozzles for injecting one or more respective planar patterns of water into a flow of the steam exiting the pressure reducing section.

5. The valve of claim 4, wherein at least one of the one or more flat nozzles are positioned upstream of an upstream-most position at which a conical pattern forming nozzle can be positioned without injecting a conical pattern of water that impacts the pressure reducing section.

6. The valve of claim 4, wherein the one or more flat nozzles are oriented to inject the planar patterns of water perpendicular to the flow of steam.

7. The valve of claim 6, wherein the one or more flat nozzles are positioned annular about the moisture jet section.

8. The valve of claim 4, comprising a plurality of nozzles spaced longitudinally in stages downstream from the one or more flat nozzles.

9. The valve of claim 8, wherein the plurality of nozzles comprises groups of nozzles in the stages.

10. A conditioning valve for desuperheating and depressuring superheated steam, the valve comprising:
    a pressure reducing section comprising:
        a plug having a small-hole section comprising:
            a cylindrical body having a bottom, a plurality of small holes scattered about the cylindrical body proximate the bottom, wherein steam exits the pressure section in rapid annular flow; and
        a moisture jet section downstream of the pressure reducing section, the moisture jet section comprising one or more flat nozzles for injecting one or more respective planar patterns of water into the flow of steam exiting the pressure reducing section.

11. The valve of claim 10, wherein the flat nozzles are oriented to inject the planar patterns of water perpendicular to the flow of steam.

12. The valve of claim 11, wherein the flat nozzles are annularly spaced about the moisture jet section.

13. A method of desuperheating and depressuring superheated steam, the method comprising:
    depressuring superheated steam;
    transforming the steam into rapid annular flow; and
    injecting one or more planar patterns of water into the rapid annular flow.

14. The method of claim 13, comprising:
    positioning nozzle jets for forming the one or more planar patterns of water proximate to structure for depressurizing the steam while avoiding contacting the structure with the planar patterns of water.

15. The method of claim 14, wherein positioning the nozzles comprises positioning at least one nozzle for forming a planar pattern of water at an upstream position to inject water into the flow while the flow is uniform and rapid and orienting the at least one nozzle to avoid contacting the structure with water from the nozzle.

16. The method of claim 13, comprising injecting the one or more planar patterns of water from positions spaced annularly about the annular flow of steam.

17. The method of claim 16, comprising injecting the one or more planar patterns of water into the annular flow prior to the flow substantially decreasing in speed or becoming substantially non-uniform.

* * * * *

UNITED STATES PATENT AND TRADEMARK OFFICE
CERTIFICATE OF CORRECTION

PATENT NO. : 6,742,773 B2
DATED : June 1, 2004
INVENTOR(S) : Hiroyuki Higuchi It is certified that error appears in the above-identified patent and that said Letters Patent is hereby corrected as shown below:

Drawings,
Substitute formal drawings with Figures 1-4, attached.

Signed and Sealed this

Fifth Day of April, 2005

JON W. DUDAS
*Director of the United States Patent and Trademark Office*

UNITED STATES PATENT AND TRADEMARK OFFICE
CERTIFICATE OF CORRECTION

PATENT NO. : 6,742,773 B2 Page 1 of 1
APPLICATION NO. : 10/039345
DATED : June 1, 2004
INVENTOR(S) : Hiroyuki Higuchi It is certified that error appears in the above-identified patent and that said Letters Patent is hereby corrected as shown below:

In Column 4, Claim 1, Line 46 – replace "a flat" with -- the --

In Column 4, Claim 3, Line 54 – delete "vapor change"

In Column 4, Claim 3, Line 54 – after "wherein" insert -- the --

In Column 6, Claim 11, Line 1 – before "flat" insert -- one or more --

In Column 6, Claim 12, Line 4 – replace "fiat" with -- flat --

In Column 6, Claim 12, Line 4 – before "flat" insert -- one or more --

In Column 6, Claim 15, Line 19 – replace "an upstream" with -- a --

In Column 6, Claim 15, Line 21 – after "the" insert -- at least one --

Signed and Sealed this

Nineteenth Day of August, 2008

JON W. DUDAS
*Director of the United States Patent and Trademark Office*